(12) United States Patent
Kim

(10) Patent No.: US 8,525,421 B2
(45) Date of Patent: Sep. 3, 2013

(54) LIGHTING APPARATUS AND METHOD

(75) Inventor: Charles J. Kim, Annandale, VA (US)

(73) Assignee: Howard University, Washington, DC (US)

( * ) Notice: Subject to any disclaimer, the term of this patent is extended or adjusted under 35 U.S.C. 154(b) by 346 days.

(21) Appl. No.: 12/959,551

(22) Filed: Dec. 3, 2010

(65) Prior Publication Data
US 2012/0139425 A1 Jun. 7, 2012

(51) Int. Cl.
H05B 37/02 (2006.01)
F21S 4/00 (2006.01)

(52) U.S. Cl.
USPC ........... 315/152; 315/149; 315/158; 315/291; 315/308; 362/23.02; 362/227; 362/249.01; 362/249.02; 362/800

(58) Field of Classification Search
USPC ...... 315/149, 152, 158, 291, 308; 362/23.02, 362/227, 249.01, 249.02, 800
See application file for complete search history.

(56) References Cited

U.S. PATENT DOCUMENTS

| | | | | |
|---|---|---|---|---|
| 6,069,676 | A * | 5/2000 | Yuyama | 349/62 |
| 7,180,252 | B2 | 2/2007 | Lys et al. | |
| 8,412,354 | B2 * | 4/2013 | Deixler et al. | 700/20 |
| 2006/0039017 | A1 * | 2/2006 | Park et al. | 358/1.9 |
| 2006/0226336 | A1 * | 10/2006 | York et al. | 250/206 |
| 2007/0211463 | A1 * | 9/2007 | Chevalier et al. | 362/249 |
| 2008/0283737 | A1 | 11/2008 | Wang et al. | |
| 2009/0001251 | A1 | 1/2009 | Ng et al. | |
| 2009/0033688 | A1 * | 2/2009 | Lin et al. | 345/691 |

OTHER PUBLICATIONS

Stephen Wolfram, "Statistical mechanics of cellular automata", Review of Modern Physics, vol. 55, No. 3, Jul. 1983.
Kevin Dowling, PhD., "LED Lighting—Technology Update", VP Innovation-Philips Solid State Lighting, Oct. 2, 2007.
Andrew Adamatzky, Identification of Cellular Automata, Taylor & Francis, Bristol, PA 1994.
International Search Report dated Jul. 31, 2012 relating to PCT/US2011/062398.

* cited by examiner

Primary Examiner — Douglas W Owens
Assistant Examiner — Thai Pham
(74) Attorney, Agent, or Firm — Fitch, Even, Tabin & Flannery LLP

(57) ABSTRACT

A lighting element is disposed in an array of lighting elements. At the lighting element, a lighting status of at least one neighboring lighting element is sensed. Independent of any other lighting element, a lighting adjustment for the lighting element by applying the sensed lighting status to a predetermined rule is determined. The lighting adjustment is applied to the lighting element to adjust an illumination of the lighting element.

16 Claims, 17 Drawing Sheets

```
              Column
       0 1 2 3 4 5 6 7 8 9
    0  0 0 0 0 0 1 0 0 0 0                    *
    1  0 0 0 0 1 0 1 0 0 0                  *   *
    2  0 0 0 0 0 0 0 0 0 0
    3  0 0 0 0 0 0 0 0 0 0
    4  0 0 0 0 0 0 0 0 0 0
Row 5  0 0 0 0 0 0 0 0 0 0
    6  0 0 0 0 0 0 0 0 0 0
    7  0 0 0 0 0 0 0 0 0 0
    8  0 0 0 0 0 0 0 0 0 0
    9  0 0 0 0 0 0 0 0 0 0
```

*FIG. 6*

```
              Column
       0 1 2 3 4 5 6 7 8 9
    0  0 0 0 0 0 1 0 0 0 0                    *
    1  0 0 0 0 1 0 1 0 0 0                  *   *
    2  0 0 0 1 0 0 0 1 0 0                *       *
    3  0 0 0 0 0 0 0 0 0 0
    4  0 0 0 0 0 0 0 0 0 0
Row 5  0 0 0 0 0 0 0 0 0 0
    6  0 0 0 0 0 0 0 0 0 0
    7  0 0 0 0 0 0 0 0 0 0
    8  0 0 0 0 0 0 0 0 0 0
    9  0 0 0 0 0 0 0 0 0 0
```

*FIG. 7*

```
              Column
       0 1 2 3 4 5 6 7 8 9
    0  0 0 0 0 0 1 0 0 0 0                *
    1  0 0 0 0 1 0 1 0 0 0              *   *
    2  0 0 0 1 0 0 0 1 0 0            *       *
    3  0 0 1 0 1 0 1 0 1 0          *   *   *   *
    4  0 0 0 0 0 0 0 0 0 0
Row 5  0 0 0 0 0 0 0 0 0 0
    6  0 0 0 0 0 0 0 0 0 0
    7  0 0 0 0 0 0 0 0 0 0
    8  0 0 0 0 0 0 0 0 0 0
    9  0 0 0 0 0 0 0 0 0 0
```

*FIG. 8*

```
              Column
       0 1 2 3 4 5 6 7 8 9
    0  0 0 0 0 0 1 0 0 0 0                  *
    1  0 1 1 1 0 1 1 1 1 0       *  *  *    *  *  *  *
    2  0 1 0 1 1 1 0 0 1 0       *     *  *  *        *
    3  0 1 1 1 0 1 0 0 1 0       *  *  *    *        *
    4  0 0 0 0 0 0 0 0 0 0
Row 5  0 0 0 0 0 0 0 0 0 0
    6  0 0 0 0 0 0 0 0 0 0
    7  0 0 0 0 0 0 0 0 0 0
    8  0 0 0 0 0 0 0 0 0 0
    9  0 0 0 0 0 0 0 0 0 0
```

*FIG. 9*

```
            Column
       0 1 2 3 4 5 6 7 8 9
    0  0 0 0 0 0 2 0 0 0 0              *
    1  0 0 0 0 0 0 0 0 0 0
    2  0 0 0 0 0 0 0 0 0 0
    3  0 0 0 0 0 0 0 0 0 0
    4  0 0 0 0 0 0 0 0 0 0
Row 5  0 0 0 0 0 0 0 0 0 0
    6  0 0 0 0 0 0 0 0 0 0
    7  0 0 0 0 0 0 0 0 0 0
    8  0 0 0 0 0 0 0 0 0 0
    9  0 0 0 0 0 0 0 0 0 0
```

*FIG. 10*

```
            Column
       0 1 2 3 4 5 6 7 8 9
    0  0 0 0 0 0 2 0 0 0 0              *
    1  0 0 0 0 2 2 2 0 0 0            ***
    2  0 0 0 0 0 0 0 0 0 0
    3  0 0 0 0 0 0 0 0 0 0
    4  0 0 0 0 0 0 0 0 0 0
Row 5  0 0 0 0 0 0 0 0 0 0
    6  0 0 0 0 0 0 0 0 0 0
    7  0 0 0 0 0 0 0 0 0 0
    8  0 0 0 0 0 0 0 0 0 0
    9  0 0 0 0 0 0 0 0 0 0
```

*FIG. 11*

```
                Column
        0 1 2 3 4 5 6 7 8 9
      0 0 0 0 0 0 2 0 0 0 0              *
      1 0 0 0 0 2 2 2 0 0 0             ***
      2 0 0 0 2 1 0 1 2 0 0            *- -*
      3 0 0 0 0 0 0 0 0 0 0
      4 0 0 0 0 0 0 0 0 0 0
Row   5 0 0 0 0 0 0 0 0 0 0
      6 0 0 0 0 0 0 0 0 0 0
      7 0 0 0 0 0 0 0 0 0 0
      8 0 0 0 0 0 0 0 0 0 0
      9 0 0 0 0 0 0 0 0 0 0
```

*FIG. 12*

```
                Column
        0 1 2 3 4 5 6 7 8 9
      0 0 0 0 0 0 2 0 0 0 0              *
      1 0 0 0 0 2 2 2 0 0 0             ***
      2 0 0 0 2 1 0 1 2 0 0            *- -*
      3 0 0 2 0 0 2 0 0 2 0           *  *  *
      4 0 0 0 0 0 0 0 0 0 0
Row   5 0 0 0 0 0 0 0 0 0 0
      6 0 0 0 0 0 0 0 0 0 0
      7 0 0 0 0 0 0 0 0 0 0
      8 0 0 0 0 0 0 0 0 0 0
      9 0 0 0 0 0 0 0 0 0 0
```

*FIG. 13*

```
              Column
       0 1 2 3 4 5 6 7 8 9
    0  0 0 0 0 0 2 0 0 0 0              *
    1  0 0 0 0 2 2 2 0 0 0             ***
    2  0 0 0 2 1 0 1 2 0 0            *-  -*
    3  0 0 2 0 0 2 0 0 2 0           *  *  *
Row 4  0 2 2 2 2 2 2 2 2 0          ********
    5  0 0 0 0 0 0 0 0 0 0
    6  0 0 0 0 0 0 0 0 0 0
    7  0 0 0 0 0 0 0 0 0 0
    8  0 0 0 0 0 0 0 0 0 0
    9  0 0 0 0 0 0 0 0 0 0
```

*FIG. 14*

```
              Column
       0 1 2 3 4 5 6 7 8 9
    0  0 0 0 0 0 2 0 0 0 0              *
    1  0 0 0 0 2 2 2 0 0 0             ***
    2  0 0 0 2 1 0 1 2 0 0            *-  -*
    3  0 0 2 0 0 2 0 0 2 0           *  *  *
    4  0 2 2 2 2 2 2 2 2 0          ********
Row 5  0 1 0 0 0 0 0 1 0 0          -       -
    6  0 0 0 0 0 0 0 0 0 0
    7  0 0 0 0 0 0 0 0 0 0
    8  0 0 0 0 0 0 0 0 0 0
    9  0 0 0 0 0 0 0 0 0 0
```

*FIG. 15*

```
              Column
        0 1 2 3 4 5 6 7 8 9
     0  0 0 0 0 0 0 0 0 0 0
     1  0 0 0 0 0 0 0 0 0 0
     2  0 0 0 0 0 0 0 0 0 0
     3  0 0 0 0 0 0 0 0 0 0
     4  0 0 0 0 0 0 0 0 0 0                  *
Row  5  0 0 0 0 0 1 0 0 0 0
     6  0 0 0 0 0 0 0 0 0 0
     7  0 0 0 0 0 0 0 0 0 0
     8  0 0 0 0 0 0 0 0 0 0
     9  0 0 0 0 0 0 0 0 0 0
```

*FIG. 16*

```
              Column
        0 1 2 3 4 5 6 7 8 9
     0  0 0 0 0 0 0 0 0 0 0
     1  0 0 0 0 0 0 0 0 0 0
     2  0 0 0 0 0 0 0 0 0 0
     3  0 0 0 0 0 0 0 0 0 0
     4  0 0 0 0 0 1 0 0 0 0              *
Row  5  0 0 0 0 1 0 1 0 0 0            * *
     6  0 0 0 0 0 1 0 0 0 0              *
     7  0 0 0 0 0 0 0 0 0 0
     8  0 0 0 0 0 0 0 0 0 0
     9  0 0 0 0 0 0 0 0 0 0
```

*FIG. 17*

```
         Column
     0 1 2 3 4 5 6 7 8 9
  0  0 0 0 0 0 0 0 0 0 0
  1  0 0 0 0 0 0 0 0 0 0
  2  0 0 0 0 0 0 0 0 0 0
  3  0 0 0 0 0 1 0 0 0 0
  4  0 0 0 0 1 0 1 0 0 0
Row
  5  0 0 0 1 0 1 0 1 0 0
  6  0 0 0 0 1 0 1 0 0 0
  7  0 0 0 0 0 1 0 0 0 0
  8  0 0 0 0 0 0 0 0 0 0
  9  0 0 0 0 0 0 0 0 0 0
```

*FIG. 18*

```
         Column
     0 1 2 3 4 5 6 7 8 9
  0  0 0 0 0 0 0 0 0 0 0
  1  0 0 0 0 0 0 0 0 0 0
  2  0 0 0 0 0 1 0 0 0 0
  3  0 0 0 0 1 0 1 0 0 0
  4  0 0 0 1 0 1 0 1 0 0
Row
  5  0 0 1 0 1 0 1 0 1 0
  6  0 0 0 1 0 1 0 1 0 0
  7  0 0 0 0 1 0 1 0 0 0
  8  0 0 0 0 0 1 0 0 0 0
  9  0 0 0 0 0 0 0 0 0 0
```

*FIG. 19*

```
              Column
       0 1 2 3 4 5 6 7 8 9
    0  0 0 0 0 0 0 0 0 0 0
    1  0 0 0 0 0 0 0 0 0 0
    2  0 0 0 0 0 0 0 0 0 0
    3  0 0 0 0 0 0 0 0 0 0
    4  0 0 0 0 0 0 0 0 0 0                    *
Row 5  0 0 0 0 0 2 0 0 0 0
    6  0 0 0 0 0 0 0 0 0 0
    7  0 0 0 0 0 0 0 0 0 0
    8  0 0 0 0 0 0 0 0 0 0
    9  0 0 0 0 0 0 0 0 0 0
```

*FIG. 20*

```
              Column
       0 1 2 3 4 5 6 7 8 9
    0  0 0 0 0 0 0 0 0 0 0
    1  0 1 1 1 1 1 1 1 1 0        ---------
    2  0 1 1 1 1 1 1 1 1 0        ---------
    3  0 1 1 1 1 1 1 1 1 0        ---------
    4  0 1 1 1 1 0 1 1 1 0        ----  ---
Row 5  0 1 1 1 0 1 0 1 1 0        ---  -  --
    6  0 1 1 1 1 0 1 1 1 0        ----  ---
    7  0 1 1 1 1 1 1 1 1 0        ---------
    8  0 1 1 1 1 1 1 1 1 0        ---------
    9  0 0 0 0 0 0 0 0 0 0
```

*FIG. 21*

```
              Column
        0 1 2 3 4 5 6 7 8 9
      0 0 0 0 0 0 0 0 0 0 0
      1 0 2 2 2 2 2 2 2 2 0         * * * * * * * *
      2 0 2 2 2 2 2 2 2 2 0         * * * * * * * *
      3 0 2 2 2 2 0 2 2 2 0         * * * *   * * *
      4 0 2 2 2 0 2 0 2 2 0         * * *   *   * *
Row   5 0 2 2 0 2 1 2 0 2 0         * *   * - *   *
      6 0 2 2 2 0 2 0 2 2 0         * * *   *   * *
      7 0 2 2 2 2 0 2 2 2 0         * * * * * * *
      8 0 2 2 2 2 2 2 2 2 0         * * * * * * * *
      9 0 0 0 0 0 0 0 0 0 0
```

*FIG. 22*

```
              Column
        0 1 2 3 4 5 6 7 8 9
      0 0 0 0 0 0 0 0 0 0 0
      1 0 2 0 2 1 2 1 2 0 0         *   * - * - *
      2 0 0 2 0 0 0 0 0 2 0           *           *
      3 0 2 0 2 0 2 0 2 0 0         *   *   *   *
      4 0 1 0 0 0 2 0 0 0 0         -       *
Row   5 0 2 0 2 2 2 2 2 0 0         *   * * * * *
      6 0 1 0 0 0 2 0 0 0 0         -       *
      7 0 2 0 2 0 2 0 2 0 0         *   *   *   *
      8 0 0 2 0 0 0 0 0 2 0           *           *
      9 0 0 0 0 0 0 0 0 0 0
```

*FIG. 23*

```
           Column
           0 1 2 3 4 5 6
         0 1 1 1 1 1 1 1
         1 1 1 1 0 1 1 1                    *
         2 1 1 0 1 0 1 1                   * *
    Row  3 1 0 1 1 1 0 1                  *   *
         4 1 0 0 0 0 0 1                  *****
         5 1 0 1 1 1 0 1                  *   *
         6 1 1 1 1 1 1 1
```

*FIG. 24*

```
           Column
           0 1 2 3 4 5 6
         0 1 0 0 0 0 0 1                  *****
         1 1 0 0 0 1 0 1                  *** *
         2 1 0 0 1 0 1 1                  **  *
    Row  3 1 0 1 0 0 0 1                  * ***
         4 1 0 1 1 1 1 1                  *
         5 1 0 1 0 0 0 1                  * ***
         6 1 0 0 0 0 0 1                  *****
```

*FIG. 25*

```
           Column
           0 1 2 3 4 5 6
         0 1 1 1 1 1 1 1
         1 1 1 1 1 1 0 1                      *
         2 1 1 1 1 0 1 1                     *
    Row  3 1 1 1 0 1 1 1                    *
         4 1 1 1 0 0 0 1                    ***
         5 1 1 1 0 1 1 1                    *
         6 1 1 1 1 1 1 1
```

*FIG. 26*

```
              Column
        0 1 2 3 4 5 6
    0   1 0 0 0 0 0 1              *****
    1   1 0 0 0 0 0 1              *****
    2   1 1 0 0 0 0 1               ****
Row 3   1 0 1 0 0 1 1              *  **
    4   1 1 1 0 0 1 1                **
    5   1 0 1 0 0 1 1              *  **
    6   1 0 0 0 0 0 1              *****
```

*FIG. 27*

```
              Column
        0 1 2 3 4 5 6
    0   1 1 1 1 1 1 1
    1   1 1 1 0 1 1 1                *
    2   1 1 0 1 0 1 1               * *
Row 3   1 0 1 1 1 0 1              *   *
    4   1 0 0 0 0 0 1              *****
    5   1 0 1 1 1 0 1              *   *
    6   1 1 1 1 1 1 1
```

*FIG. 28*

LIGHTING APPARATUS AND METHOD

FIELD OF THE INVENTION

This application relates to lighting systems, and more specifically to arrays of lighting elements.

BACKGROUND

Various lighting configurations have been used over the years to light areas and/or provide information to users. One such lighting approach involves the use of light emitting diodes. As well as using individual diodes, light emitting diodes can be used together in arrays to provide general illumination, comfort lighting, architectural lighting, and light sculpture to mention a few examples. To take one example, LED arrays are often used in automotive applications.

Previous LED arrays were controlled according to a centralized control approach. More specifically, a central computer or controller determined the status of each and every LED in the array. Status determination software was used to determine the status and the central computer issued commands to control the individual LEDs in the array. Numerous controllers were also used to relay the commands to the individual LEDs in the array.

Unfortunately, previous systems suffered from various shortcomings. To take one example, in an array of tens of thousands of LEDs, thousands of individual controllers were needed to control the individual LEDs. In addition to the numerous controllers and other hardware elements that were required, extensive wiring for the control signals was needed to communicate commands from the central computer to all the controllers. The extensive wiring was expensive to provide, cumbersome to install, complicated to repair, and could introduce transmission and/or electrical interference problems.

Because of the above-mentioned limitations, previous systems were expensive as well as complicated to install and maintain. As a result, users were often dissatisfied with these approaches.

BRIEF DESCRIPTION OF DRAWINGS

FIGS. 4-28 comprises various light patterns generated at a light array containing a plurality of light fixtures according to various embodiments of the present invention;

Figure 1:
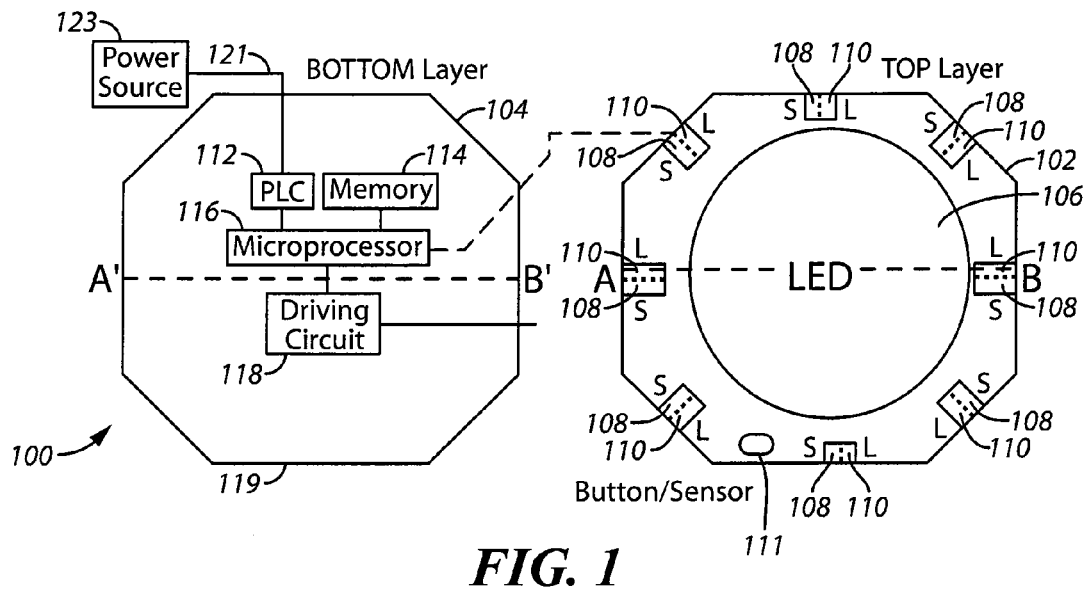
FIG. 1 comprises views of the top and bottom layers of a light fixture according to various embodiments of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE PREFERRED EMBODIMENTS

Distributed and decentralized approaches are provided to control individual LED fixtures in array of fixtures where each fixture contains one or more individual LEDs. The approaches described herein allow the LEDs fixtures to operate independently from all the other fixtures. As a result, the amount of wire needed in the system is significantly reduced. Additionally, no special data lines are needed to transmit information from a central controller. In this respect, existing power lines may be used to transmit information from a central computer to all the fixtures. After this initialization is complete, the fixtures may operate independently from the other fixtures.

In a many of these embodiments, a lighting element is disposed in an array of lighting elements. At the lighting element, a lighting status of at least one neighboring lighting element is sensed. Independent of any other lighting element, a lighting adjustment for the lighting element is determined by applying the sensed lighting status to a predetermined rule. The lighting adjustment is then applied to the lighting element to adjust an illumination of the lighting element.

In one example, the lighting status may be the light intensity level of the at least one neighboring lighting element. The sensed light intensity level, in one aspect, indicates whether the at least one lighting element is on or off. In this case, applying the sensed lighting status to the predetermined rule produces a light intensity adjustment, and applying the lighting adjustment includes adjusting the intensity level of the lighting element.

The light intensity adjustment may include a variety of types of adjustments. For example, the light intensity adjustment may be an adjustment that activates the light element or an adjustment that deactivates the lighting element. Other types of adjustments are possible.

Any number of neighboring lighting elements may be sensed. In one example, eight lighting elements are used. However, other numbers are possible based, for example the configuration and dimensions of the lighting fixtures in the array and the placement of the fixture relative to other fixtures.

In others of these embodiments, a light element fixture includes a lighting element, at least one sensor that is configured to sense the lighting status of at least one neighboring light source, a memory, and a processor. The memory is configured to store a predetermined rule. The processor is coupled to the lighting element, the at least one light sensor, and the memory. The processor is configured to determine a lighting adjustment for the lighting element by applying the sensed lighting status to the predetermined rule. The processor is further configured to apply the lighting adjustment to the lighting element to adjust an illumination of the lighting element. A single fixture housing has disposed therein the lighting element, the sensors, the memory, and the processor.

In some aspects, the at least one sensor is configured to sense light intensity. In other aspects, the at least one sensor is configured to sense color. In some other aspects, the at least one sensor is disposed along periphery of the housing. Other placements of the sensor are possible.

In other aspects, the rule produces a light intensity adjustment. In other examples, a color adjustment is provided. The lighting element in one example is a light emitting diode. Other types of lighting elements may also be used.

In others of these embodiments, a lighting array is provided. The array includes an array housing and a plurality of lighting fixtures disposed within the array housing. Each of the lighting fixtures includes a separate controller and a separate lighting element from the others. Each of the separate controllers control actuation of the separate lighting element independently from any other lighting elements in any of the other fixtures in the array.

In some aspects, each of the lighting fixtures further comprises at least one sensor that is configured to sense light intensity. In other aspects, the at least one sensor is configured to sense color. In still other aspects, the at least one sensor is disposed along periphery of a housing of the fixture. In yet other aspects, each of the separate controllers is configured to determine a lighting adjustment for the separate lighting element by applying the sensed lighting status to a predetermined rule and each of the separate controllers is further configured to apply the lighting adjustment to the lighting element to adjust an illumination of the lighting element.

In the examples described herein, the lighting elements used are light emitting diodes. However, it will be appreciated that other types of light elements may be used and that the approaches described herein are not limited to using LEDs. It will also be appreciated that the fixture includes a housing and the elements of the fixture (e.g., processors, LEDs and so forth) are disposed within, on the outside, or at the fixture. The fixture housing couples to an array housing to which other fixtures are coupled. To take one example, a socket on the array housing may allow the individual fixtures to be screwed into the array. Other coupling arrangements between the fixtures and the array housing are possible.

In many of these embodiments, the control of a LED array is accomplished using a distributed control approach to generate a pattern in the array by determining the state of each LED in the array. The state of an LED can be, for example, for a white LED, ON or OFF, light or dark, or 1 or 0. For a colored LED, different color or spectrum dictated by color code or equivalent number to the color code can be utilized.

Consequently, the approaches described herein solve the problem of the need to deploy numerous controllers and the heavy wirings of previous systems. It will be appreciated that the distributed control approaches described herein are used for the control of LED arrays and LED fixtures (containing one or more LEDs), which are disposed within the arrays.

Individual LEDs can be disposed at the LED fixture. The LED fixtures are mechanical housing units that house the LEDs along with driving, control, switching and/or color spectrum circuits. Multiple LED fixtures can be deployed together in an LED array. A single or multiple LEDs can be disposed in a single fixture (together with driving, control, switching, and/or color spectrum circuits).

In the approaches described herein, an LED array control system is realized and installed inside an LED fixture. In other words, an LED fixture is an independent controller that is controlled according to a rule residing in a memory. Sensed information is applied to the rule and the result of this application is output from the controller to (potentially) change the state of the lighting source(s) (i.e., the LED) at the fixture.

As used herein, the expression "sensing the neighboring LEDs" means that for each LED fixture obtaining the lighting status (e.g., on, off, red, blue, white, dark, and so forth) by use of photo- or color-sensors (or some other sensor) or of wired (or wireless) communications (or signals) received from the neighboring LED fixtures. In the examples described herein, however, only the photo- or color-sensor example is used but it will be appreciated that other examples are possible.

As used herein the expression "generation of timing pulses" or "timing pulse generation" means that an LED fixture either generates the desired timing pulses from its own LED fixture (using a timing pulse generator or some other approach), or receives timing pulses, instead of generating its own timing pulses, from an LED fixture (or some other external source), which contains a timing pulse generation apparatus. In the one dimensional control approaches (described herein), the LEDs in the same row act according to the same timing information (i.e., they are synchronized). Therefore, if one of the LEDs in the same row has a timing pulse generation apparatus, it could send the same timing pulses to the other LEDs in the row via wired or wireless signaling or communication. If this signaling or communication of timing pulses is undesired, it could be determined to have all LEDs contain a pulse generator and use the timing pulses generated by its own generator.

As used herein, the term "rule selection" means, while running under a given rule, an LED fixture is desired to change to another rule. In one approach, a rule change applies to all the LEDs in the array; all LED fixtures must be effected by the rule change. The broadcasting of the new rule (in the form of a rule number or the rule logic itself) can be done via wireless medium or power line communication over the same power line supplying to the LED driving circuit and the LED itself.

As used herein, the term "initial state selection" means for a specific LED fixture to start with a given state, 1 or 0, or light or dark, or red or blue, and so forth. In the one dimensional approaches (described herein), one or a few LEDs of the first row can start with, for example, state 1 with all other LEDs in the array with 0. In the two dimensional approaches (described herein), a center LED or 4-corner LEDs, for example, can have state 1 or Red, for example, with all others with 0 or Blue, when the control initiates. The number of LED fixtures in an array that need the means of initial state selection, therefore, is limited to 1 or a few or maybe several. Hence, not all LED fixtures need to be provided with this function.

Figure 2:
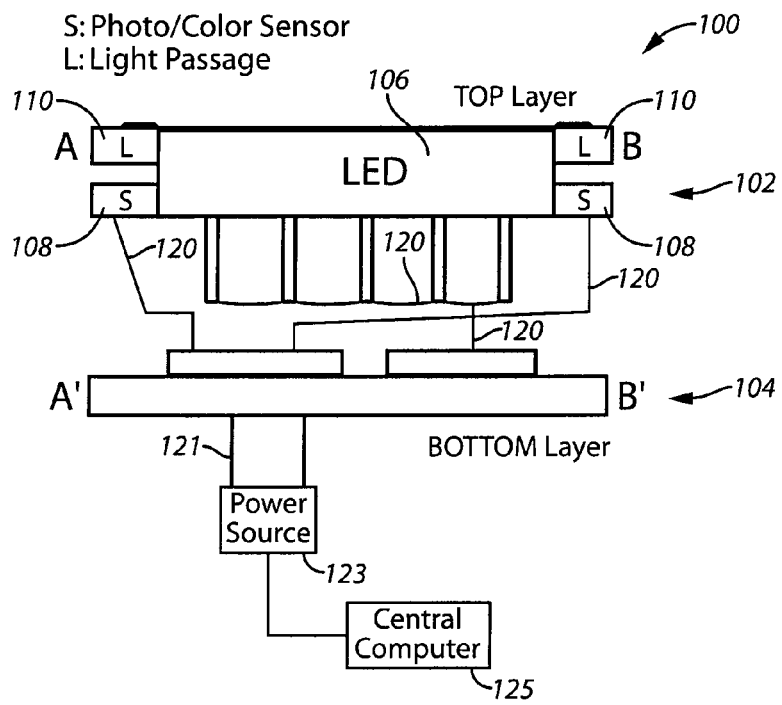
FIG. 2 comprises cross sectional views taken along lines A-B and A'-B' of the top and bottom layers of FIG. 1 according to various embodiments of the present invention.

Referring now to FIGS. 1 and 2, a lighting fixture 100 includes a top layer 102 and a bottom layer 104. The top layer 102 includes an LED 106, light passages 108, and light sensors 110. The bottom layer 104 includes a power line communication circuit (PLC) 112, a memory 114, a microprocessor 116, and a driving circuit 118. A power source is coupled to the PLC 112. The power source may also be disposed within the fixture 100. The top layer 102 is disposed over the bottom layer 104. Various wires 120 couple the electrical components together. A housing 119 houses the top and bottom layers. In this respect, the housing may be a metal or plastic structure that has its various elements disposed within the housing (e.g., the microprocessor 116) or along a periphery of the housing (e.g., the sensors 108). The housing may open at the top and sides to allow light from the LED 106 to be emitted through the top for main illumination purposes (e.g., as part of a display) and through the sides via light passages for displaying light status information to neighboring light fixtures.

The LED 106 includes one or more light emitting diodes. These light emitting diodes may be of any shape, color, configuration, brightness, to mention a few examples of parameters.

The light passages 108 allow light to be emitted from the LED 106 so that sensors of neighboring LED fixtures can sense this light. The light sensors 110 are any type of sensor that senses light intensity, color, frequency, or any other light parameter. In one example, the light sensors are photosensors. Other examples of light sensors are possible The memory 114 stores operating instructions and rules for the microprocessor 116. The microprocessor 116 executes the instructions from the memory 114. The driving circuit 118 includes hardware and/or software that converts the instructions from the microprocessor 116 into electrical signals that drive the LED 106.

The LED 106 (or group of LEDs) is the main lighting source in the LED fixture 100 whose status (e.g., on, off, color) is driven by the driving circuitry 118 but controllable by the microprocessor 116. The microprocessor 116, when a new rule is needed, receives a rule broadcast by a computer via the power line communication circuit 112 which is applied in the LED fixture 100 and all other fixtures of the entire LED array of which the fixture 100 is a part. The memory 114 is attached to the microprocessor 116 contains and stores the rule provided by the computer. The microprocessor 116, upon a given rule, reads the neighbor status (i.e., the status of a neighboring LED in a neighboring LED fixture) via the sensors 108 installed in the LED fixture 100 and controls the LED unit according to the rule.

The power line communication (PLC) circuit 112 in the LED fixture 100 couples data to the same power line servicing electricity to the LED 106 and LED driving circuit 118 as well as to provide a communication path between the central computer and the microprocessor 116. By utilizing PLC-based communication over the same power line 121 which supplies power to the LED driving circuit 118, there is no need of separate data line from the central computer to the LED fixture 100.

The fixtures can be configured to provide various functions. For instance, one type of fixture contains a driving unit that supplies current from the power source to the LED with a switching on-and-off function. Another type of LED fixture provides color generation and contains additional circuitry for this color generation. In addition, each LED fixture may contain a communication circuit for data/control signal transfer with the microprocessor 116 mentioned above for LED array control. The LED fixture is configured to mechanically and electrical accommodate all the components into a structure to be connected to a conventional lamp socket or a similar standardized terminal to receive power from the main power source 123.

A separate computer (e.g., a personal computer 125), which can communicate with the power line communication circuit 112 of the LED fixture can broadcast a new rule, if desired, to all the LEDs in the LED array via the same power supply line which powers the LED fixture.

As explained elsewhere herein, the LED fixture either generates timing pulses using a timing pulse generator (or some other approach), or receives timing pulses from another LED fixture (or some other source). These timing pulses are used as a common clock to provide a timing framework that allows the LEDs in the individual fixtures to be controlled and synchronized as between the various fixtures so that coherent lighting patterns can be presented to users.

In some aspects, the distributed control approaches described herein are based mathematically on cellular automata, which is a discrete mathematical modeling basis. In modeling natural systems, differential equations are one example of a modeling basis that can be used. Generally speaking, differential equations are suitable for systems with a small number of continuous degrees of freedom, evolving in a continuous manner. Cellular automata are an Fn alternative, complementary basis for mathematical models of system. Cellular automata describe the behaviors of systems with large numbers of discrete degrees of freedom. Put another way, cellular automata represent a mathematical idealization of physical systems in which space and time are discrete, and physical quantities take on a finite set of discrete values. Cellular automata have been applied in biological systems to model growth of organisms or populations of plant with local ecological interaction.

More specifically, cellular automata consist of a discrete lattice ("array") of sites ("cells"). Each site takes in a finite set of possible values and the value of each site evolves, in discrete time steps, simultaneously, according to the same deterministic rules. The rules for the evolution of a site depend only on a local neighborhood of sites around it.

Cellular automata may utilize the same rules at every site and provide a rich and complex pattern generation capability. In the present LED array lighting control approaches described herein, each LED corresponds to the "site" of cellular automata. The cellular automata approach is an inherently distributed control of a system behavior that allows each site of the system (i.e., each lighting fixture 100) to act by checking the conditions (e.g., lighting conditions) of neighboring sites and applying the same rule to determine the next time-step status of its own site. In this manner, each site is controlled independently from the others. Put another way, this independent and distributed status approach allows the status of the system as whole (i.e., the array of fixtures 100) to evolve as the discrete time steps continue to progress.

The status in LED array lighting control corresponds to the light status or condition of an LED. The status can be, for example, a white LED, turned on or turned off. For a color LED case, the status can be a color on the color spectrum the LED generates. The system in LED array lighting control corresponds to the LED array itself, and the system's behavior corresponds to the lighting pattern generated on the LED array.

Once a rule is transmitted to all the LEDs (with a microcontroller in the LED fixture, as described elsewhere herein), then each LED, without any command or control from any element outside of its lighting fixture, changes its status according to the rule. The attributes of the rule are the status of the neighboring LEDs. One example of a rule is "If 2 neighbors out of 8 are in status 1, then the next status of the fixture is 1." Another example of a rule is: "If the left neighbor LED's status is 1 and the right neighbor LED's status is 1, and the current status of the fixture is 1, then the next status of the fixture is 0." In these examples, status 1 can mean a turn-on status, and status 0 a turn-off status.

Still another example of the rule is: "If the west neighbor out of a neighborhood of 4 is red, and the east neighbor is yellow, and the north neighbor is dark, then the next status of the fixture is green." This rule simultaneously applies to all the LEDs in the array to form a pattern in the array made by the different statuses of the LEDs in the array.

In the present approaches, a "neighborhood" can be defined by an operator or user. Only 2 or 3 LEDs ahead of an LED can become a neighborhood. In another example, 8 LEDs surrounding an LED can form a neighborhood. In still another example, only 4 surrounding LEDs can form a neighborhood for the LED in the center. Many different examples of rules are possible and can be determined by analyzing the different values one LED can have, and the different neighborhood a user can choose. With different rules, the user can select to generate a desired pattern.

Thus, one advantage of the present approaches is that distributed control of each LEDs in an array is provided at each LED in the array according to a rule which depends only on its neighbor's status. Each of the all the other LEDs in the array are also controlled as if each of these LEDs are the only LED in the array whose status is determined by the same rule. Therefore, there is no need of centralized control approach that requires numerous controllers and heavy wirings to each of the LEDs in an LED array. This elimination of wirings and controllers significantly reduces the installation time and cost of the LED array.

The sensors in the LED fixture are configured to recognize the status of the neighboring LED fixtures arranged in the LED array. The sensors can be placed in any number and in any place in the fixture as long as the appropriate neighbors required to be sensed by a given rule are observable. For example, if a neighborhood is determined to be two neighboring LEDs diagonally ahead of an LED, then two sensors may be placed at the Northwest (NW) and Northeast (NE) the fixture to detect the status of the neighbor LEDs. However, when a neighborhood is composed of all eight neighboring LEDs surrounding a center LED in a lattice structure array, for the LED fixtures shaped in square or rectangular form, then there are eight sensors placed at North, South, East, West, NW, NE, Southeast, and Southwest locations in the center LED. If the shape of the LED fixture is, for example, a hexagon shape, then six sensors can be placed at each side of the hexagon to cover the maximum number of neighbors.

If the LEDs in an array are white LEDs, one function of the sensors is to detect the presence or absence of white light by observing the light which comes out through the light passage of the neighboring LED fixture. If a color LED or a group of LEDs that can generate different color is used in LED array, then the sensor should be able to detect not only the on-off status but also different colors of the neighboring LED. Therefore, a color sensor is installed in an LED fixture for color LED array applications.

The multiple light passages 110 (e.g., in the form of slits) are used to send light indicating LED status that is transmitted from the fixture 100 to neighboring fixtures so that their sensors can detect the status of the LED fixture 100. The placement of the light passages 110 is arranged so that each light passage should align with a sensor of a neighboring LED fixture. By aligning, it is meant that the light passage 110 and corresponding sensor are disposed proximally across or opposite from each other such that light emitted from the passage is sensed by the sensor and little or no stray light from other sources (e.g., other passages or fixtures) is sensed by the sensor. Therefore, in one example a sensor and a light passage are positioned at the same or proximal location in such a way that a sensor in an LED fixture receives the light only from a neighboring LED but not the light from the same or any other fixture.

A auto-manual (on-off-color) mode switching button 111 (or sensor of IR, wireless, and other external source) is used to allow the LED fixture 100 to operate in different modes: as a usual site LED of cellular automata approach with initial turn-off status ("auto mode"); as a usual site LED automata approach with initial turn-on status ("auto mode with initial on"); as a usual cellular automata approach with initial turn-on with a certain color status ("auto initial on with a color"); or as an independent site LED which does not change its status but keeps its initial status permanently ("manual mode with off or on mode"). If a "manual mode with off or on mode" is selected for an LED fixture, the LED in the array is separated from the pattern generation by the said rules of neighboring status, by which further or more various desired light pattern can be obtained with the cellular automata approach. The switching button 111 can be pressed (or if it is a sensor, information received) such that the fixture 100 operates in the various modes. In other words, the mode selection or change from a mode to another mode can be done by a manual push button or switch installed in the LED fixture which is arranged to be accessible to users or by a wireless remote sensing system or sensor with a matched remote mode selector for users.

Figure 3:
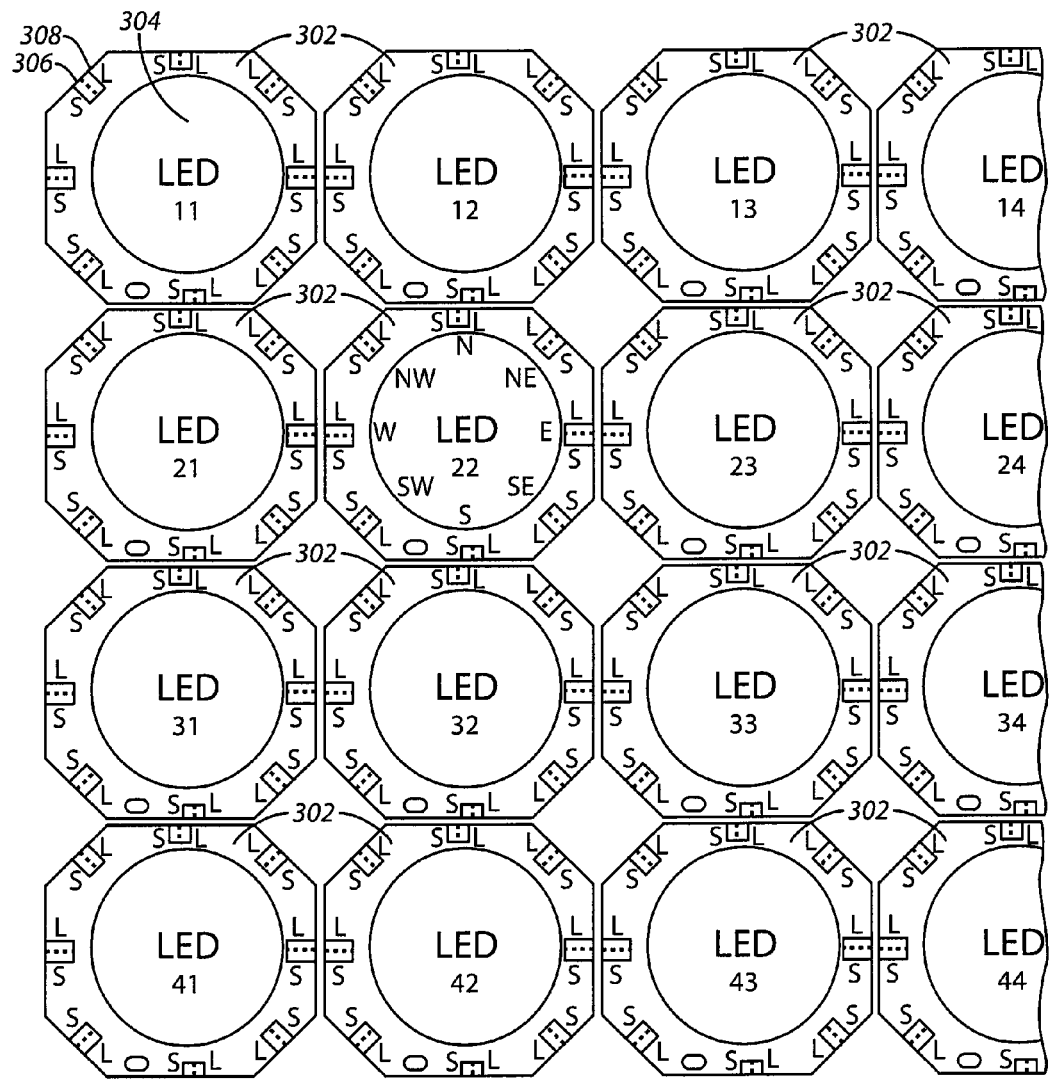
FIG. 3 comprises a lighting array including a plurality of fixtures according to various embodiments of the present invention.

Referring now to FIG. 3, one example of an array 300 of fixtures is described. The array includes a plurality of fixtures 302. Each fixture 302 includes LED 304, sensors 306, and light passages 308. The fixtures 302 are numbered in array fashion 1,1; 1,2, and so forth where the first number corresponds to the row and the second number corresponds to the column. The array element 22 is labeled further with directional labels, N (north), S (south), E (East), W (west), NE (northeast), SE (southeast), NW (northwest), and SW (southwest).

The operation of LED fixtures as the sites of an LED array is described here with respect to FIG. 3 in which an array of multiple LEDs are arranged to form a lattice. With reference to the LED at the second row and the second column of the lattice (LED 22), one example of the cellular automat based distributed LED array control, utilizing the LED (fixture) is described. When the LED 22 is set as an auto mode of operation, the LED 22 is now a part of the LED array in light pattern generation. Through the PLC of the LED fixture, a specific rule is received from the broadcast message of a main computer or controller, and that the rule specifies that the neighborhood is composed of 8 neighboring LEDs (N, S, E, W, NW, NE, S, and SE). Then, all 8 sensors of the specified direction are used to detect the status of the neighbors in the 8 directions: the N neighbor LED 12, the NW neighbor LED 11, the S neighbor LED 32, and so forth.

During an initial time period or at an initial time, the neighbor statuses are read from the 8 sensors to the microprocessor of LED 22 and at the next discrete time, the status of LED 22 is determined by the rule and its status is realized by the driving unit in it. This process that is executed in the LED 22 occurs at all the LED fixtures in the array simultaneously at each time step, and the pattern in the array forms and evolves as the time step moves forward discretely.

Figures 4, 5:
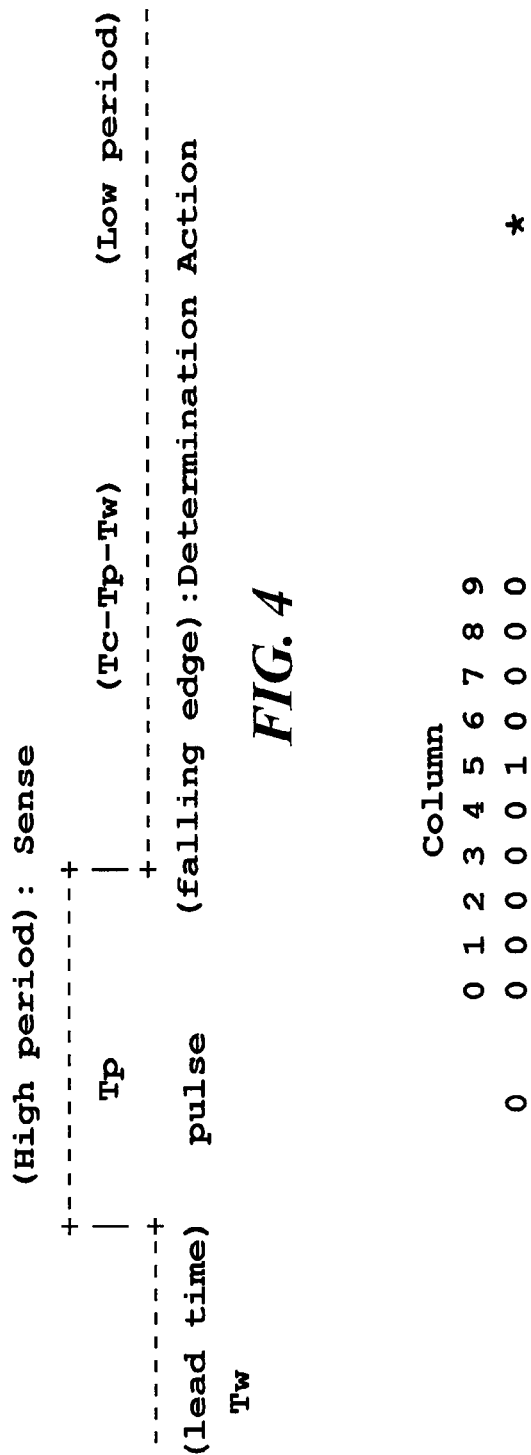

Referring now to FIG. 4, one example of one-dimensional (1-D) LED array pattern generation in which a row of the LEDs is controlled by the states of the immediately preceding (e.g., above, left, down, or right) LED row is described. In the 1-D array pattern generation, the neighbors of an LED are the LEDs (two, three, or as many as the sensing capability of the LED allows) of the immediately preceding row. Since the 1-D pattern generation is timed operation, row by row, sensing the neighbors and determining the LED state of a row is done only after the sensing and determining of LED states of the preceding row. The timing for each row can be made by the pulse generator of each LED of the row. The high period of the pulse (or the low period in other examples) is used for sensing. At the falling edge of the pulse (or the rising edge in other examples), the LED is used to determine the action (e.g., turn on or off) to be applied to the LED.

The lead time of the first row is the shortest and that of the last row, longest. After the last row is timed to sense and determine the states of the LEDs, the timing sequence of lead time and pulsed sensing and determination repeats to continue the pattern generation steps. The lead time, duration of the pulse for sense and determination, and the period of one complete cycle from top to bottom rows, can be selected by the size of the array, the speed of pattern formation transition, and the preference of the user. The selection, for each of the LEDs in an array, of the row number, the lead time, duration of sense and determination, and the period of one complete cycle can be accommodated by providing manual switches or a remote communication module implemented in the LED fixture. Additionally, the initial state of an LED, on or off, or a color code, can be determined by one of the above-mentioned manual switches or by the said remote controller module in the LED fixture.

Referring now to FIG. 5, another example of light pattern generation is described. For simplicity and illustration purposes, the array size in this example (as well as the examples of FIGS. 6-28) is 10-by-10 (10 rows and 10 columns of, and thus, a total of 100 LEDs) and each LED in this description is indicated by either a square cell of filled (full or partial) or blank, or a position with a number. The vertical one dimensional LED array pattern generation by which the pattern form from top to bottom rows can be performed as follows for the 10-by-10 LED array with state number 0 for dark (OFF) and 1 for light (ON). The first row acts as the initial condition for the pattern generation. Since each of the 10 LEDs in the first row can have either 1 or 0 state, the possible number of initial condition is, considering the order from column 0 to column 9, 2*2*2*2*2*2*2*2*2*2=1024. For illustration purposes, it can be assumed that the first row initial condition is set by turning on the LED in the fifth column and by turning off the rest of the LEDs in the row. Then, after the first row lead time after reset or power on to the array, the array state is as follows: all LEDs are zero except the LED in row 0 and column 5, which can be conveniently expressed by LED(0, 5)=1 and LED(r,c)=0 for all r's and c's except r=0 and c=5. The pattern by the 1/0 state array is shown at the right with * marks for those with state 1 in the array of FIG. 5.

A one-dimensional LED array pattern generation for white LEDs is now described. When the lead time for row 1 (which is longer than that of the row 0) expires, the LEDs in the row 1 now sense the neighbor in row 0 and determine their states. The neighbor of an LED in row can be an LED just above ("North (N) direction"), or two LEDs in the 45 degrees above, left and right, "Northwest (NW) direction" and "Northeast (NE) direction", respectively, or the three LEDs in N, NW, and NE direction. Now, the applicable rule for the LED state determination based on the state of the neighbor must be determined before any array pattern generation can be accomplished. To describe the rules of transition, for example, it is assumed that the neighbor is the three LEDs in N, NW, and NE direction, with exception of the LEDs in the columns 0 and 9, respectively, which have only two neighboring LEDs in the row above. For example, LED (1, 1) has the following neighboring LEDs: LED(0,0), LED(0,1), and LED(0,2). On the other hand, LED (2,5) has the LED(1,4), LED(1,5), and LED(1,6) as its neighbor. In general, except the LEDs in column 0 and 9, respectively, LED(i, j) has the following neighboring LEDs: LED(i−1, j−1), LED(i−1, j), and LED(r−1, c+1), for r=[1, 9] and c=[1, 8].

For the LED (r, 0) has the following neighboring LEDs: LED(r−1,0) and LED(r−1,1) for r=[1,9]. On the other hand, the LED (r, 9) has the following neighboring LEDs: LED(r−1,8) and LED(i−1,9) for r=[1,9].

Rules for one example of one-dimensional LED array pattern generation for white LEDs are now described. In the three-LED neighbor case, there are eight possible states of the neighboring LEDs, each number from left indicating LED state of NW, N, and NE direction: 000, 001, 010, 011, 100, 101, 110, and 111. For each of the eight neighbor states, the determining states of the subject LED are two, 0 and 1, which makes the possible number of state determining rules is 2*2*2*2*2*2*2*2=256. The rules can be numbered and they can be formed as an 8 bit pattern, from left to right, the states of the subject LED for each of the eight possible neighboring states from 000 to 111, with rule numbers inside parentheses in decimal equivalents to the 8-bit bit patterns read as binary numbers: From 00000000(0) which reads as the state of LED is always 0, to 00000001(1) which reads as the state of LED is 1 only if all neighboring LEDs are 1's other wise 0, to 00000010 (2) which reads as the state of LED is 1 if NW and N neighboring LEDs are 1 and NE neighboring LED is 0, and otherwise 0, and to 11111111 (255) which makes the subject LED state always 1. Assuming the rule number 72 (the pattern of 01001000) is chosen, a pattern generation step is illustrated here. The rule states that the LEDs in the next row become 1 only if their NW, N, and NW neighboring LEDs are in the state of {001} or {100}, otherwise 0. In the example, the two LEDs of each row having only 2 neighboring LEDs are kept 0 states all the time.

Starting from the row 1, LED(1,0)=LED(1,9)=0 since it has only 2 neighbors. The LEDs in the row 1 has the following state, with LED(0, c)=0 for all c except 5.
LED(1,0)=0
LED(1,1)={LED(0,0), LED(0,1), LED(0,2)}={0 0 0}=0
LED(1,2)={LED(0,1), LED(0,2), LED(0,3)}={0 0 0}=0
LED(1,3)={LED(0,2), LED(0,3), LED(0,4)}={0 0 0}=0
LED(1,4)={LED(0,3), LED(0,4), LED(0,5)}={0 0 1}=1
LED(1,5)={LED(0,4), LED(0,5), LED(0,6)}={0 1 0}=0
LED(1,6)={LED(0,5), LED(0,6), LED(0,7)}={1 0 0}=1
LED(1,7)={LED(0,6), LED(0,7), LED(0,8)}={0 0 0}=0
LED(1,8)={LED(0,7), LED(0,8), LED(0,9)}={0 0 0}=0
LED(1,9)=0

Therefore, the first two rows of the LED array are now formed with turned on LEDs as * marks as shown in FIG. 6.

After the lead time of the second row LEDs, the similar state determining process starts. Now, the LEDs in the row 1 has the following state, with LED(1, 4)=LED(1,6)=1 with all others 0. The LEDs in the row 2 has the following states:
LED(2,0)=0
LED(2,1)={LED(1,0), LED(1,1), LED(1,2)}={0 0 0}=0
LED(2,2)={LED(1,1), LED(1,2), LED(1,3)}={0 0 0}=0
LED(2,3)={LED(1,2), LED(1,3), LED(1,4)}={0 0 1}=1
LED(2,4)={LED(1,3), LED(1,4), LED(1,5)}={0 1 0}=0
LED(2,5)={LED(1,4), LED(1,5), LED(1,6)}={1 0 1}=0
LED(2,6)={LED(1,5), LED(1,6), LED(1,7)}={0 1 0}=0
LED(2,7)={LED(1,6), LED(1,7), LED(1,8)}={1 0 0}=1
LED(2,8)={LED(1,7), LED(1,8), LED(1,9)}={0 0 0}=0
LED(2,9)=0

Then, the first three rows of the LED array are now formed as follows, with turned on LEDs indicated with * marks as shown in FIG. 7.

And, execution of the process continues until the control system is reset, power down occurs, or a new rule is selected. If a rule pattern 01001100 is chosen for the above-mentioned example, this makes the subject LED state 1 if the neighboring LED pattern is {001}, {100}, or {101}, and otherwise 0, the rows 0, 1, 2, and 3 of the array would have different states as follows:

LED(1,c)={LED(0,c−1), LED(0,c), LED(0,c+1)}=1, for c=4 and 6; 0 otherwise.

LED(2,c)={LED(1,c−1), LED(1,c), LED(1,c+1)}=1 for c=3, 5, and 7; 0 otherwise.

LED(3,c)={LED(2,c−1), LED(2,c), LED(2,c+1)}=1 for c=2, 4, 6, and 8; 0 otherwise.

FIG. 8 shows the pattern that is so generated.

With possible 1024 different ways of initializing the row 0 LEDs and the possible 256 different rules of LED state determination, the possible number of pattern generations can reach over 2 million. If a color LED is considered, with only R(red)-G(green)-B(blue) combination alone, the one neighboring LED can have eight different states, which leads to 8*8*8=512 different neighbor LED states. Considering the same eight states a subject LED can have, the total number of rules reaches 8 to the power of 512, which is a large number, 2 with 462 trailing 0's, just for a given initial condition.

A one-dimensional LED array pattern generation for white LEDs using a modulo 2 rule is now described. In the specifically white LED array control case, a simple rule, instead of that of all combination of the neighboring patterns, can be applied. In one example, this rule is called modulo-2 rule because the subject LED's state becomes 1 only if, for example, the three neighboring LED states, from left to right, NW to N to NE direction, read as binary numbers, are modulo-2 numbers; otherwise their value becomes a 0. The pattern 100 for example, which is 4 in decimal, is divisible by 2, and thus a modulo-2 number. All even numbered patterns including 0, i.e., 000, 010, 100, and 110, are modulo-2 numbers in the example. Applying to the modulo-2 rule to the above example, the first 4 rows are determined as shown in FIG. 9.

The variation of the pattern under modulo-2 rule is primarily decided by the initial condition of the first row. Other modulo numbered rule can be also possible, for example, modulo-8. The alternative modulo numbered rule is more convincing in the case of colored LED array, where a state of an LED can become more than just 2 kinds, 0 and 1: it can be 8 (by the combinations of R-G-B).

A one dimensional array control of color LEDs is now described. For simplicity purposes, further simplification of the possible states of a color LED is used to reduce to 3, Red (state 2), Green (state 1), and Blue (state 0), and a rule is applied. The state determination rule considers that the maximum sum of the 3 neighboring LED states is 6, and the minimum 0. An example rule can be formed as follows:

LED(t+1)=0 if sum of {NW-LED(t), N-LED(t), NE-LED(t)} is 0, 3, or 6.

LED(t+1)=1 if sum of {NW-LED(t), N-LED(t), NE-LED(t)} is 1 or 4.

LED(t+1)=2 if sum of {NW-LED(t), N-LED(t), NE-LED(t)} is 2 or 5.

An initial condition (t=0) for the example is set the LED (0,5)=2 and all other LED(r,c)=0 for all r and c except r=0 and c=5. Therefore, at t=0, and during the lead time, the state of the 10 by 10 array has the following table and pattern. As shown in FIG. 10, state 2 is marked by a star (*), state 1 by a bar (-), and state 0 blank.

As the time t=1 pulse is generated at the LEDs in row 1, the sensing of three neighboring LEDs starts simultaneously and at the falling edge of the pulse, the state transition occurs. Then, at the end of t=1, the array pattern reaches as shown in FIG. 11.

At time t=2, similarly done at t=1, sensing and state determination and transition to the state occur by the end of the time t=2, which changes the array pattern as shown in FIG. 12. The patterns at time t=3, t=4, and t=5 are shown in FIG. 13, FIG. 14, and FIG. 15.

A two dimensional pattern generation approach is described. The two-dimensional control of an LED array applies the transition of the LED state to all LEDs in any row any column in the array at the same timing pulse common to every LED fixture. The lead time, pulse duration (where pulse period high is for sensing and the falling edge is the time to change the LED state), and the completed cycle time are the same for all LEDs in the array. And, the neighbor of an LED can be all eight surrounding LEDs (e.g., in case of hexagonal cell grids, instead of square, the number becomes six) or just four or any number of LEDs immediately surrounding the LED. In the examples taken here, a square cell LED array is assumed. Then, the 8 neighboring LEDs of an LED in the grid of r row and c column, except those at the four borders which would be kept in a state of 0 or 1, comprises of: N-direction LED or N-LED represented by LED(r−1, c); NE-LED, LED (r−1, c+1); E-LED, LED(r,c+1); SE-LED, LED(r+1, c+1); S-LED, LED(r+1,c); SW-LED, LED(r+1,c−1); W-LED, LED(r, c−1); NW-LED, LED(r−1, c−1). If only LEDs are considered as a neighbor of an LED, the following 4 would be used: N-LED, E-LED, S-LED, and W-LED. In the two dimensional control of LED array, a state at time t of an LED, LED(r,c,t) is determined by the states of the neighbor LEDs at time (t−1). The time unit is the time between two consecutive pulses on which the sensing and determining the state of LED is executed in the entire array.

For simplicity and illustration purposes, for the same 10-by-10 array, it is assumed that only two states (1 and 0, ON or OFF, or Light or Dark) are allowed for each LED which has a neighbor of four LEDs in N, E, S, and W direction. The initial condition can be set any way: turn on the center LED or turn on all four corner LEDs or turn on randomly chosen LEDs. So the number of possible initial condition in theory is 2 to the power of 100, which is a large number. To describe the rules of LED state at time t based on the states of the neighboring LEDs at time (t−1), the four neighboring LED states at time (t−1) is written as a 4-digit binary number, each bit representing, from left to right, N-LED(t−1), E-LED(t−1), S-LED(t−1), and W-LED(t−1). Then, there are a total of 16 different neighbor states, which are 4-bit binary numbers, from 0000 to 1111. The subject LED's state at time t for each of the 16 different states of its neighbor at time (t−1) is 2. Therefore, there are 2 to the power of 16 number, over 65 million possible rules.

A two dimensional pattern generation approach for 2-state, 4-neighbor configuration is now described. For illustration, a two-dimensional pattern generation for a 4-neighbor, 2-state LED array of 10-by-10 is considered. The 2-state LED means that the LED is white color with only ON (1) or OFF (0) state. Also, as the initial condition at t=0, the LED (5,5) is turned on before the process starts with all the other LED (r,c) are turned off as shown in FIG. 16.

Out of tremendously large number of rules, an example rule of the LED(t)=1 if there is at least one state 1 neighboring LEDs at time (t−1). This rule applies to all LEDs in the array that has 4 neighboring LEDs of N, E, S, and W. Consequently, the LEDs bordering the array keep their current states all the time.

At the first pulse at time t=1, all the LEDs except the border LEDs simultaneously sense during the pulse is at high state their 4 neighboring LED states, and if there is at least one LED is in state 1, at the falling edge of the pulse, they set their states based on the rule. Therefore after t=1 pulse, the array would have the states shown in FIG. 17.

Then, at the time t=2 pulse, the LED array is changed to the state shown in FIG. 18. At t=3, the pattern now expands further outward to the state of FIG. 19. This approach of pattern generation proceeds according to the generated pulses, and lead times, and the completion cycle times for the LEDs in the array.

The illustrated example shows just one case with one given initial condition and a rule out of tremendously large number, and the rich of the variety of patterns is enormous and, therefore, for desired patterns for use, users of this invention may want to try, preferably using computer simulation, to generate patterns before deciding which rule and which initial condition to choose. However, since the approaches described herein provide for changing the rules for use via communication, wireless or power line communication, a computer simulation is not mandatory for the practical use of the approaches described herein.

A two dimensional pattern generation approach for color LEDs with 4-Neighbor Case is now described. If a color LED is considered, with only R(red)-G(green)-B(blue) combination alone, the one neighboring LED can have 8 different states, which leads to 8*8*8*8=4096 different neighbor LED states. Considering the same 8 states a subject LED can have, the total number of rules reaches at another astronomical number just for a given initial condition. By further simplifying the possible states of a color LED to 3, Red (state 2), Green (state 1), and Blue (state 0), and applying a simple rule, the array control can be illustrated using the same 10-by-10 array.

The state determination rule starts from the observation that the maximum sum of 4 neighboring LED states is 8, and the minimum 0. A simple example rule can be formed as follows:
LED(t+1)=0 if sum of {N-LED(t), E-LED(t), S-LED(t), W-LED(t)} is 1, 2, 3, or 6.
LED(t+1)=1 if sum of {N-LED(t), E-LED(t), S-LED(t), W-LED(t)} is 0 or 7.
LED(t+1)=2 if sum of {N-LED(t), E-LED(t), S-LED(t), W-LED(t)} is 4, 5, or 8.

An initial condition (t=0) for the example is set the LED (5,5)=2 and all other LED(r,c)=0 for all r and c except r=5 and c=5. Therefore, at t=0, and during the lead time, the state of the 10 by 10 array has the following table and pattern. In the accompanying patter, state 2 is marked by a star (*), state 1 by a bar (-), and state 0 blank as shown in FIG. 20.

As the time t=1 pulse is generated from all the LEDs in the array start simultaneously sense neighboring LED states and, at the falling edge of the pulse, execute the state transition following the same rule for all LEDs. Then, at the end of time t=1, the array pattern reaches as shown in FIG. 21. At the end of time t=2, the pattern in FIG. 22 will result. As time moves on, at t=20 for example, the pattern develops to the pattern illustrated in FIG. 23.

A reversible pattern generation is now described. As described above, the LED array pattern generation, whether it be one dimensional or two dimensional control method, is relied heavily upon two factors: initial condition and the selection of a rule. In other words, using the approaches described herein, a desired pattern is provided as an initial condition, the pattern can be repeated or, at least, periodically reappeared after a certain number of timing pulses.

One approach for identification of reversible cellular automata needs two main ways of apprehending and creating patterns: mechanistic and intuitive. The first point approach assumes that any pattern can be analyzed into cause and effect from which relationships of state transition with neighboring states and of recurrent validity can be deduced. The second approach gives an opportunity to enter in to the wild abundance of creative activity that accepts the slight accidental. However, some very simple reversible cellular automate can be formed from mundane rules similar to those applied in the illustration of the two dimensional control approach.

A reversible cellular automata applied to white LEDs of 7-by-7 array in two dimensional control approach is described now. The reversible cellular automata, for 4-neighbor LEDs for example even though only 1 neighboring LED is actually used, is deceptively simple enough to have the following rule:

| W-LED (t) | E-LED (t) | LED (t + 1) |
|---|---|---|
| 0 | 0 | 1 |
| 0 | 1 | 1 |
| 1 | 0 | 0 |
| 1 | 1 | 0 |

The rule simply shifts the original design to the left, as can be seen from the depicted patterns, flipping the states.

The initial condition is the desired condition and the one depicted here is a letter A formed by the cells (i.e., LEDs) of the array as follows. The pattern next to the array is formed by * marks for 0 state and blank for 1 state as shown in FIG. 24.

At time t=1, the simple reversible cellular automata applies to all the LEDs in the array, and the initial pattern breaks in to a jumble *'s and blank spaces as shown in FIG. 25. At t=2, the pattern of FIG. 26 appears.

At time t=11, it proceeds to the following pattern, which still is not close to the design pattern, letter A as shown in FIG. 27. However, at time t=14, it finally evolves to the design pattern letter A and it repeats at every time which is multiple of 14 as shown in FIG. 28.

To implement an approach of locally controlling light patterns in an LED array using the idea of cellular automata, without using the conventional method of controlling each individual LED with by a central main controller with control wires running from the central controller to each of the LEDs in the array, hardware and software components must be combined together around each of the LEDs to provide the following essential function: (1) sensing the neighboring LED states, (2) execution of a chosen rule by the sensed neighboring states, and (3) generation (or reception) of timing pulses on which the rule execution is synchronized by rows (for a one dimensional control approach) or across the array (for a two dimensional control approach). Additionally, (1) rule selection functions, (2) initial state selection functions, and (3) timing pulse selection functions provide convenience in changing patterns, once the array is installed, without manually accessing the LEDs.

Figure 29:
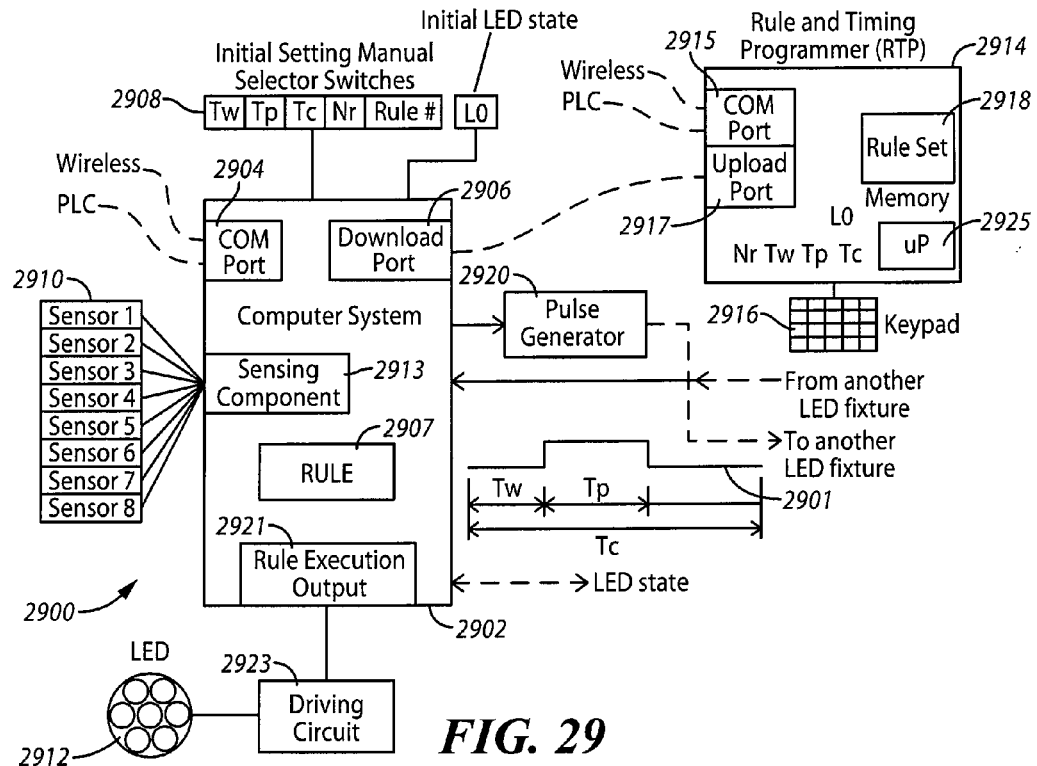
FIG. 29 comprises a block diagram of a lighting fixture according to various embodiments of the present invention.

The structure of another example of an LED fixture 2900 is now described as shown in FIG. 29. The fixture 2900 is composed of a computer system or a microcontroller 2902 which is configured to process information received via a communication port 2904 and a download port 2906 for initialization and update information reception. The microcontroller 2902 is also configured to read information from a set of manual switches 2908 installed in the LED fixture 2900. The items to be determined before the start of the pattern control for each LED fixture include: the row number (Nr) where the LED fixture would be placed in an array, for example, Nr=2 for row 2, which may be necessary for 1-D control scheme; the leading or waiting period (Tw) of the timing pulse 2901 (e.g., 0.3 second); the high pulse period (Tp) of the timing pulse 2901 during which sensor information from sensors 2910 is read to the control system (e.g., 0.3); the complete cycle period (Tc), which indicates the entire time period of one process of sense and state determination for an LED 2912 and is dependent upon, among others, the number of rows in the array, an example value 1 minute; the rule number or rule (Rule #) to be used in the process; and the initial LED state (L0), which can have an LED fixture (in the first row and the fifth column of an array, for example) started with state 1 or 0, or Red or blue, as illustrated in the one dimensional control description mentioned above.

The initial items can be either determined by the manual selector switches 2908 separately placed in the LED fixture or by downloaded from a Rule and Timing Programmer (RTP) 2914, a separate system not installed in LED fixture. The RTP 2914 includes a processor 2925 and can be realized by a computer system which is capable of wired communication downloading and wireless or PLC communication of the items needed in the LED fixtures that can be typed in by a keypad 2916 attached to the RTP 2914 or available in a memory 2918 inside the RTP 2914. The RTP 2914 includes a COM port (to receive wireless or PLC data) and an upload port 2917 (to upload information to the download port 2906). A rule 2907 is downloaded via COM port 2904. The information from the sensors is processed by sensing components 2913. A rule execution output 2921 (with instructions as to how to drive the LED 2912) drives a driving circuit 2923 that converts the instructions to electrical signals to control the LED 2912.

Another approach for initializing the items mentioned above, whether via manual selector switches 2908 or by RTP 2914, is to obtain the row number (Nr) and a table of the row number and the timing pulse information for the row number, which is stored inside the memory of the controller and retrievable to the computer system, instead of reading them all separately. This alternative approach is advantageous if the initial setting values are to be downloaded or communicated from the RTP 2914.

The timing pulse information is now fed to a pulse generator 2920 so that the pulse generator 2900 (disposed in the LED fixture 2900) can produce and provide the timing pulses to the fixture 2900 or another LED fixture (which may or not have a pulse generator). Also, with or without the pulse generator 2920, the LED fixture 2900 can opt to receive the timing pulse from another LED fixture. After the lead (waiting) time, when the high pulse arrived to the computer system, the computer system reads sensor information for neighboring LED states from all eight sensors, for example, depending upon the one dimensional or two dimensional control approaches and the number of neighboring LEDs. As mentioned above, the "sensor information" can be the outputs of photo- or color-sensors or the LED state information from neighboring LEDs via different approaches. As far as the high pulse is sustained, monitoring of the sensor (or state) information repeats, without executing the rule and sending out the rule output to the driving circuit. By this approach, all LEDs in the same row would be synchronized at the action of state change when the pulse goes to zero ("failing edge"). At the falling edge of the pulse, the output of the controller generated by the rule is sent out to the LED driving circuit, which in turn by the output, turns on or off the LED (which may be composed or a single light-emitting-diode or a group of light-emitting-diodes to form a single unit) or generates a color dictated by the output.

Figure 30:
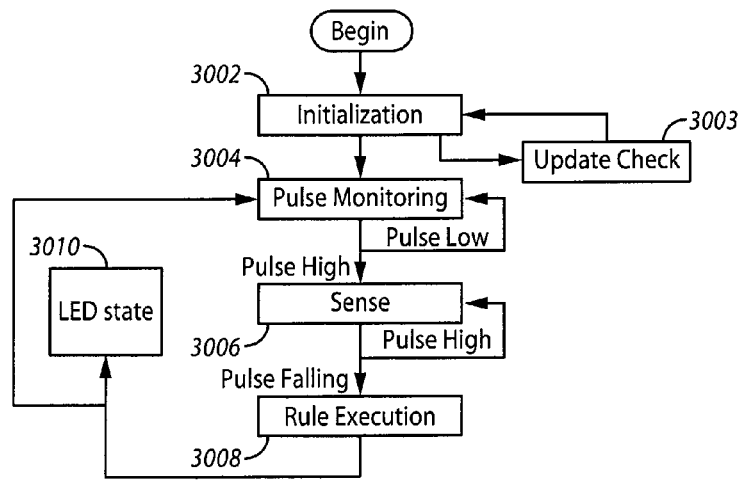
FIG. 30 comprises a flowchart showing one approach to operating a lighting fixture (e.g., the fixture of FIG. 29) according to various embodiments of the present invention FIG. 31 comprises a diagram showing LED fixtures in an LED array according to various embodiments of the present invention.

Referring now to FIG. 30, one example of an approach for controlling the computer system in an LED fixture (e.g., the system of FIG. 29) is described. This approach applies to each of the all LED fixtures installed in an array.

At step 3002, initialization occurs. At this step, a rule may be downloaded from a central computer. Once the initialization process is complete (including determination of row number, timing pulse format, and initial state), the update check can be done at step 3003. The update check can be interrupted by the reception of data over COM port, download port, or manual switch selector position change, for a new rule, for a new timing pulse format, to mention a few examples. In one example, the update check is interrupt-driven so that the computer system, whatever it is doing, can be stopped and the update information can be received to each LED fixture.

At step 3004, when there is no interrupted update, the computer system monitors the timing pulse and this timing pulse is sensed at step 3006. If the timing pulse is high, then the computer system continues at step 3006 and senses the neighboring LED states. This sensing loop repeats and continues as long as the timing pulse stays high. When the pulse falls to zero, at step 3008, rule execution (based on the sense information) is accomplished by which the LED driving circuit changes the LED state at step 3010 and execution returns to the pulse monitoring stage for another round of sense and state determination step 3004. The LED state of the LED fixture will be sent via the light condition of the LED itself (sensed by sensors of other LED fixtures) or via communication (signaling) medium (i.e., without involving light passage or photo- or color-sensors from other LED fixtures).

Figure 31:
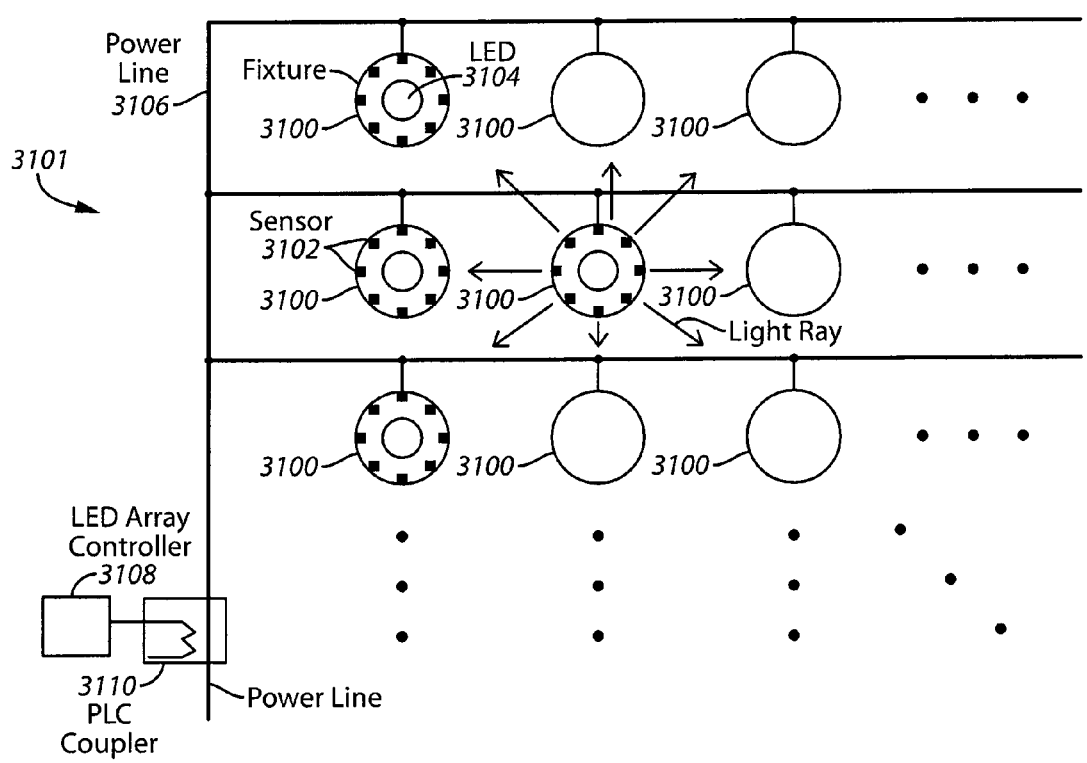
Figure 32:
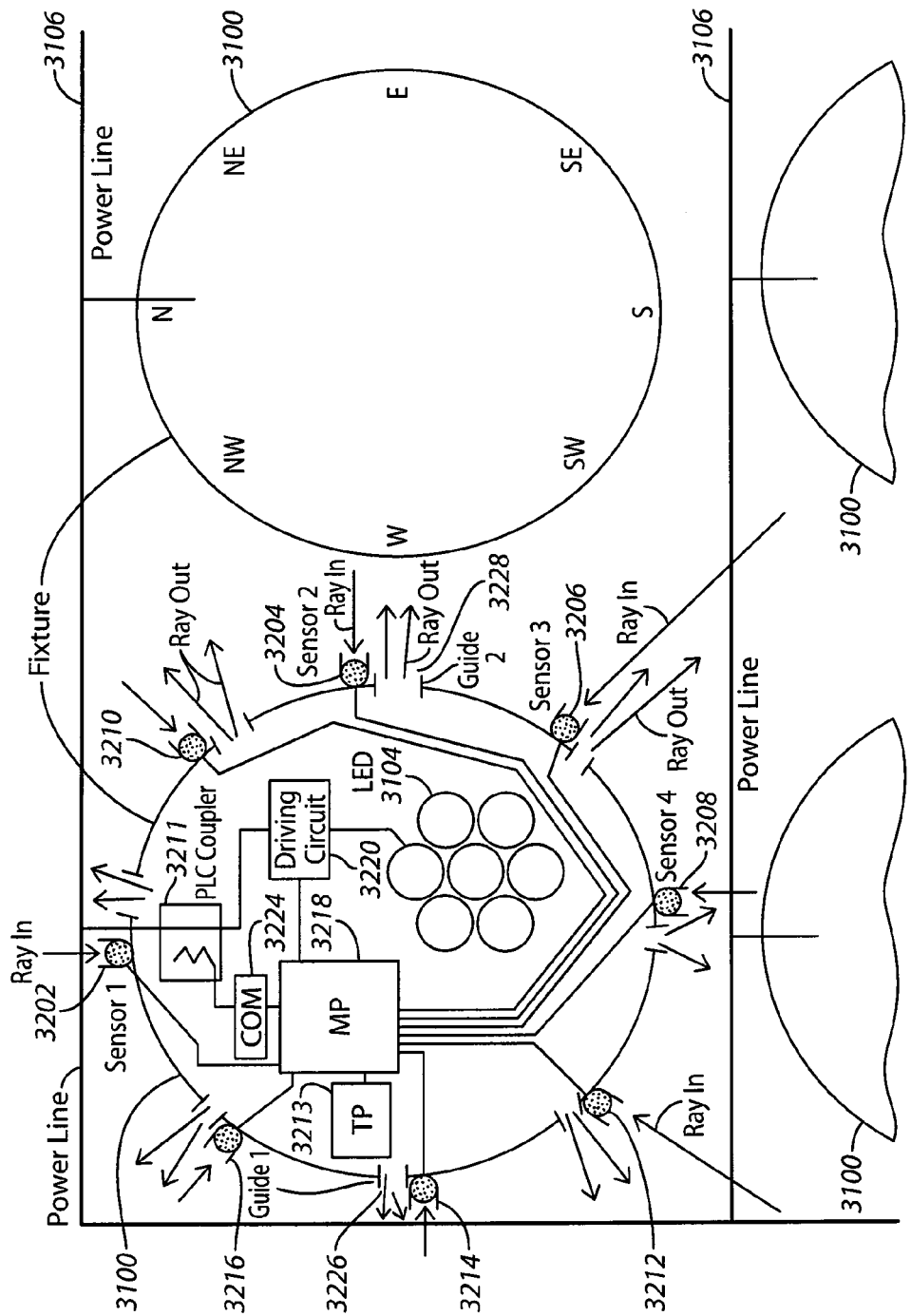
FIG. 32 comprises a diagram showing LED fixtures in an LED array according to various embodiments of the present invention.

Referring now to FIG. 31 and FIG. 32, the connection of LED fixtures in an LED array is now described. The light array 3101 includes light fixtures 3100. The light fixtures include LEDs 3104 and sensors 3102. A power line 3106 is coupled to the fixtures 3100. An LED array controller 3108 is coupled to the power line 3106 via a PLC coupler 3110.

Generally speaking, there is no condition or limitation in the mechanical or geometrical placement of the fixtures 3100 and the formation of the array 3101 as long as fixtures 3100 are arranged in such a way that the light produced by the LED(s) 3104 of a fixture 3100 can reach to and be sensed by its neighboring fixtures 3100 but not by those fixtures outside the neighborhood of a particular fixture (the number of neighboring fixtures being eight in FIGS. 31 and 32, or four, in another example). In other words and in this example, the fixtures 3100 are not mechanically connected or joined in any way. Instead, within a neighborhood, they are linked only by light rays and sensing apparatus (sensors) that detect the light rays. Alternatively, in some examples portions of the fixtures may be physically joined. Of course, the fixtures 3100 are coupled to the same power line 3106.

All fixtures 3100 are powered by the same power supply line 3106 for its electricity source for LED lighting 3104 and the operation of the circuits inside the fixtures. By the pre-programmed rule stored in the circuit of a fixture 3100, which determines a state (e.g., ON or OFF for white LEDs, or RED, GREEN, BLUE for color LEDs) of its own LED based on the states of the neighboring LEDs, each fixture drives its LED to the determined state. This individual action of each fixture 3100 of the array 3101, combined together, generates a lighting pattern in the array 3101.

If a new rule is desired for another pattern, the same power line 3106 can be utilized to upload the rule through the power line communication (PLC) coupler 3110, for example, from an LED array controller 3108 which can be served by a computer with communication capability. Alternatively, a wireless communication can link the LED array controller 3108 to each of the fixtures 3100 for uploading the new rule.

In either approach, since each fixture 3100 will have the same rule, the communication burden is much lowered by broadcasting the same information to all the fixtures 3100 without need of information individualization (i.e., having to transmit individual messages to each of the fixtures). It will be appreciated that in the array 3101, since the original preprogrammed rule or new rules can be uploaded, there is no individual control wire or approach to control each fixture separately as is found in the previous LED array lighting approaches.

Referring now specifically to FIG. 32, the link in the fixture neighborhood (i.e., the internal structure of a fixture and its connection in the neighborhood and its action according to the sensor-provided states of the neighbors) is now described. As explained elsewhere herein, each fixture 3100 is served by the same power line 3106 which sources the collection of light emitting diodes (LED) 3104 and the circuits to sense the neighboring states and the drive the LED to a determined state. The states of the neighboring LEDs of fixtures are determined by its sensors strategically located to identify, for each sensor, the state of only one neighboring fixture in the neighborhood.

For example, a first sensor 3202 is arranged to receive rays only from its neighboring fixture of North (N) direction to identify the status of its N-direction neighbor only. A second sensor 3204 is similarly arranged to receive rays from and identify the state of its East (E)-direction neighbor only. Third and fourth sensors 3206 and 3208 are arranged only for SE-direction and S-direction neighbor only, respectively. All other sensors 3210, 3212, 3214, and 3216 are similarly arranged to receive from and identify only one assigned neighbor. A microprocessor 3218, driving circuit 3220, a timing pulse generator 3213, communication port 3224 are disposed in each fixture 3100. The operation of these elements has been described previously and will not be repeated again here. A separate PLC coupler 3211 couples each fixture 3100 to the power line 3106.

The state of its own LED (and fixture) 3104 is displayed toward, for example, all 8 neighbors, by the rays produced by the LED through the light passage guides, Ray Out, one ray passage to only one assigned neighboring fixture. For example, a first light passage guide 3226 is arranged so that the ray of the LED is directed toward and reaches at the sensor of W-direction neighbor only. Similarly, a second light passage guide 3228 is arranged to ray out only for the E-direction neighbor fixture. All other light passage guides (not labeled in the fixture to aid in readability of the drawing) are similarly arranged to send the ray of the fixture, for each guide to only one assigned neighbor.

Thus, it will be understood that a link between neighboring fixtures is made only via the light rays and the sensors that detect these light rays. In other words, there is no direct electrical or mechanical connection between fixtures in the array (except the power line). Using the linkage of the light ray and sensors, the microprocessor (MP) 3218 of a fixture determines the state of the fixture's LED 3104 by the rule residing in the memory in the MP 3218 (or in a separate chip or device) and activates the LED driving circuit 3220, all timed by the timing pulse (TP) generator 3213, to the determined state. A new rule, when desired, can be downloaded through the same power line 3106 serving the fixture circuit and LEDs using the communication (COM) port 3224 of the each fixture circuit via, for example, the PLC coupler 3211 to the microprocessor 3218 (of each fixture), sent from an LED array controller (not shown in FIG. 32) via, for example, a similar PLC coupler of the controller through the same power line 3106.

While the invention herein disclosed has been described by means of specific embodiments and applications thereof, numerous modifications and variations could be made thereto by those skilled in the art without departing from the scope of the invention.

What is claimed is:

1. A method of illuminating a first lighting element and a second lighting element, the first lighting element disposed in a first housing and the second lighting element disposed in a second housing, the method comprising:
   sensing an illumination lighting status of the second lighting element;
   determining an illumination adjustment for the first lighting element by applying the sensed illumination status to a status rule, wherein the status rule defined as a light status or a condition of the second lighting element;
   applying the illumination adjustment to the first lighting element to adjust an illumination of the first lighting element, the applying being effective to control illumination of the first lighting element independently from the illumination of the second lighting element.

2. The method of claim 1 wherein sensing the illumination status comprises sensing a color level of the second lighting element.

3. The method of claim 1 wherein the sensed illumination status indicates whether the second lighting element is on or off.

4. The method of claim 1 wherein applying the sensed illumination status to the status rule produces an illumination adjustment, and wherein applying the illumination adjustment comprises adjusting the intensity level or the color of the first lighting element.

5. The method of claim 1 wherein the second lighting element comprises eight lighting elements.

6. A light element fixture, the fixture comprising:
   a first lighting element;
   a first sensor configured to sense an illumination status of a second lighting element;
   a memory, the memory configured to store a status rule, wherein the status rule defined as a light status or a condition of the second lighting element;
   a first processor coupled to the first lighting element, the first sensor, and the memory, the first processor being configured to determine an illumination adjustment for the first lighting element by applying the sensed illumination status to the status rule, the first processor being further configured to apply the illumination adjustment to the first lighting element to adjust an illumination of the first lighting element;
   wherein a first housing having disposed therein the first lighting element, the first sensor, the memory, and the first processor;
   wherein the second lighting element is disposed in a second housing that includes a second processor and a second sensor, such that the second processor is configured to control illumination of the second lighting element, the illumination of the second lighting element being controlled independently from the illumination of the first lighting element and the illumination of the first lighting element being controlled from the illumination of the second lighting element independently.

7. The light fixture element of claim 6 wherein the first sensor and the second sensor are configured to sense light intensity.

8. The light fixture element of claim 6 wherein the first sensor and the second sensor are configured to sense color.

9. The light fixture element of claim 6 wherein the first sensor is disposed along periphery of the first housing.

10. The light fixture element of claim 6 wherein the rule produces an illumination intensity adjustment.

11. The light fixture of claim 6 wherein the first lighting element comprises at least one light emitting diode.

12. A lighting array, the array comprising:
   an array housing including a first light element fixture and a second light element fixture;
   wherein the first light element fixture include:
      a first lighting element,
      a first sensor configured to sense a second illumination status of at least a second lighting element;
      a first memory configured to store a first status rule, wherein the first status rule defined as a light status or a condition of the second lighting element;
      a first processor coupled to the first lighting element, the first sensor, and the first memory,
      the first processor being configured to determine a first illumination adjustment for the first lighting element by applying the sensed second illumination status to the first status rule, the first processor being further configured to apply the first illumination adjustment to the first lighting element to adjust an illumination of the first lighting element;
      a first housing having disposed therein the first lighting element, the first sensor, the memory, and the first processor;
   wherein the second light element fixture includes:
      the second lighting element,
      a second sensor configured to sense a first illumination status of at least the first lighting element;
      a second memory configured to store a second status rule, wherein the second status rule defined as a light status or a condition of the first lighting element;
      a second processor coupled to the second lighting element, the second sensor, and the second memory,
      a second housing having disposed therein the second lighting element, the second sensor, the second memory, and the second processor;
      the second processor being configured to determine a second illumination adjustment for the second lighting element by applying the sensed first illumination status to the second status rule, the second processor being further configured to apply the second illumination adjustment to the second lighting element to adjust an illumination of the second lighting element;
   wherein illumination of the second lighting element is controlled independently from the illumination of the first lighting element and the illumination of the first lighting element being controlled from the illumination of the second lighting element independently.

13. The lighting array of claim 12 wherein each of the first light element fixture and the second light element fixture comprises at least one additional sensor that is configured to sense illumination status.

14. The lighting array of claim 13 wherein the first sensor and the second sensor are configured to sense color.

15. The lighting array of claim 13 wherein the first sensor is disposed along periphery of the first housing.

16. The lighting of claim 12 wherein the first light element and the second lighting element comprises at least one light emitting diode.

* * * * *

UNITED STATES PATENT AND TRADEMARK OFFICE
CERTIFICATE OF CORRECTION

PATENT NO.        : 8,525,421 B2                                    Page 1 of 1
APPLICATION NO.   : 12/959551
DATED             : September 3, 2013
INVENTOR(S)       : Kim It is certified that error appears in the above-identified patent and that said Letters Patent is hereby corrected as shown below:

In the Claims

Column 18, line 12, claim 1, after "illumination" delete "lighting"
Column 18, line 51, claim 6, before "a" delete "wherein"
Column 19, line 5, claim 11, delete "fixture" and insert -- fixture element --
Column 19, line 10, claim 12, delete "include:" and insert -- includes: --
Column 20, line 29, claim 16, delete "lighting" and insert -- lighting array --

Signed and Sealed this
Twenty-ninth Day of April, 2014

Michelle K. Lee
*Deputy Director of the United States Patent and Trademark Office*